United States Patent
Balch et al.

(10) Patent No.: US 7,023,346 B2
(45) Date of Patent: Apr. 4, 2006

(54) ANTENNA SYSTEM INCLUDING SIMULTANEOUS PHASE AIDING AND PHASE CANCELING ELEMENTS

(75) Inventors: Brent F. Balch, Fort Lauderdale, FL (US); John O'Connell, Cork (IE); William H. Hurd, Rochestown (IE); Tom Spalding, Cork (IE)

(73) Assignee: Sensormatic Electronics Corporation, Boca Raton, FL (US)

( * ) Notice: Subject to any disclaimer, the term of this patent is extended or adjusted under 35 U.S.C. 154(b) by 46 days.

(21) Appl. No.: 10/854,878

(22) Filed: May 27, 2004

(65) Prior Publication Data

US 2005/0162276 A1    Jul. 28, 2005

Related U.S. Application Data

(60) Provisional application No. 60/478,942, filed on Jun. 16, 2003.

(51) Int. Cl.
| | |
|---|---|
| G08B 13/14 | (2006.01) |
| G08B 13/24 | (2006.01) |
| H04Q 5/22 | (2006.01) |
| H04Q 1/00 | (2006.01) |
| H01Q 7/00 | (2006.01) |

(52) U.S. Cl. .................. 340/572.7; 340/572.1; 340/572.7; 340/10.1; 343/700 R; 343/842; 455/41; 455/502; 455/503

(58) Field of Classification Search ............ 340/572.1, 340/572.7, 10.1; 343/700 R, 842; 455/41, 455/502, 503
See application file for complete search history.

(56) References Cited

U.S. PATENT DOCUMENTS

| | | | |
|---|---|---|---|
| 4,679,046 A | | 7/1987 | Curtis et al. |
| 5,321,412 A | * | 6/1994 | Kopp et al. ................ 343/742 |
| 6,020,856 A | | 2/2000 | Alicot |
| 6,118,378 A | * | 9/2000 | Balch et al. ............. 340/572.7 |
| 6,201,469 B1 | * | 3/2001 | Balch et al. .............. 340/10.1 |
| 2002/0121991 A1 | | 9/2002 | Rostren |

* cited by examiner

*Primary Examiner*—Jeffery Hofsass
*Assistant Examiner*—Lam Pham

(57) ABSTRACT

A system for minimizing the effect of null zones in an interrogation zone of a marker detection system. The system includes a reference antenna system configured to produce a first reference electromagnetic field during a first time period. The antenna system also includes a phase canceling antenna system configured to produce a second electromagnetic field substantially in phase with the reference electromagnetic field during the first time period and a third electromagnetic field substantially out of phase with the reference electromagnetic field during the first time period. The phasing of the first field or the second and third fields may be continuously switched while the phase of the other is held constant. A method of spatially shifting null zones in an interrogation zone of a marker detection system is also provided.

29 Claims, 15 Drawing Sheets

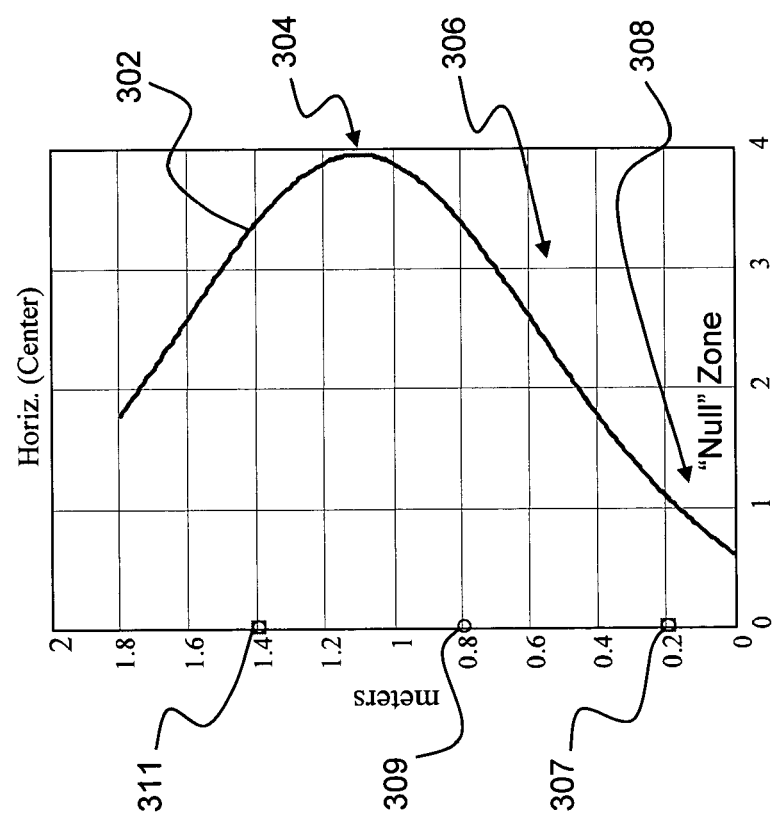

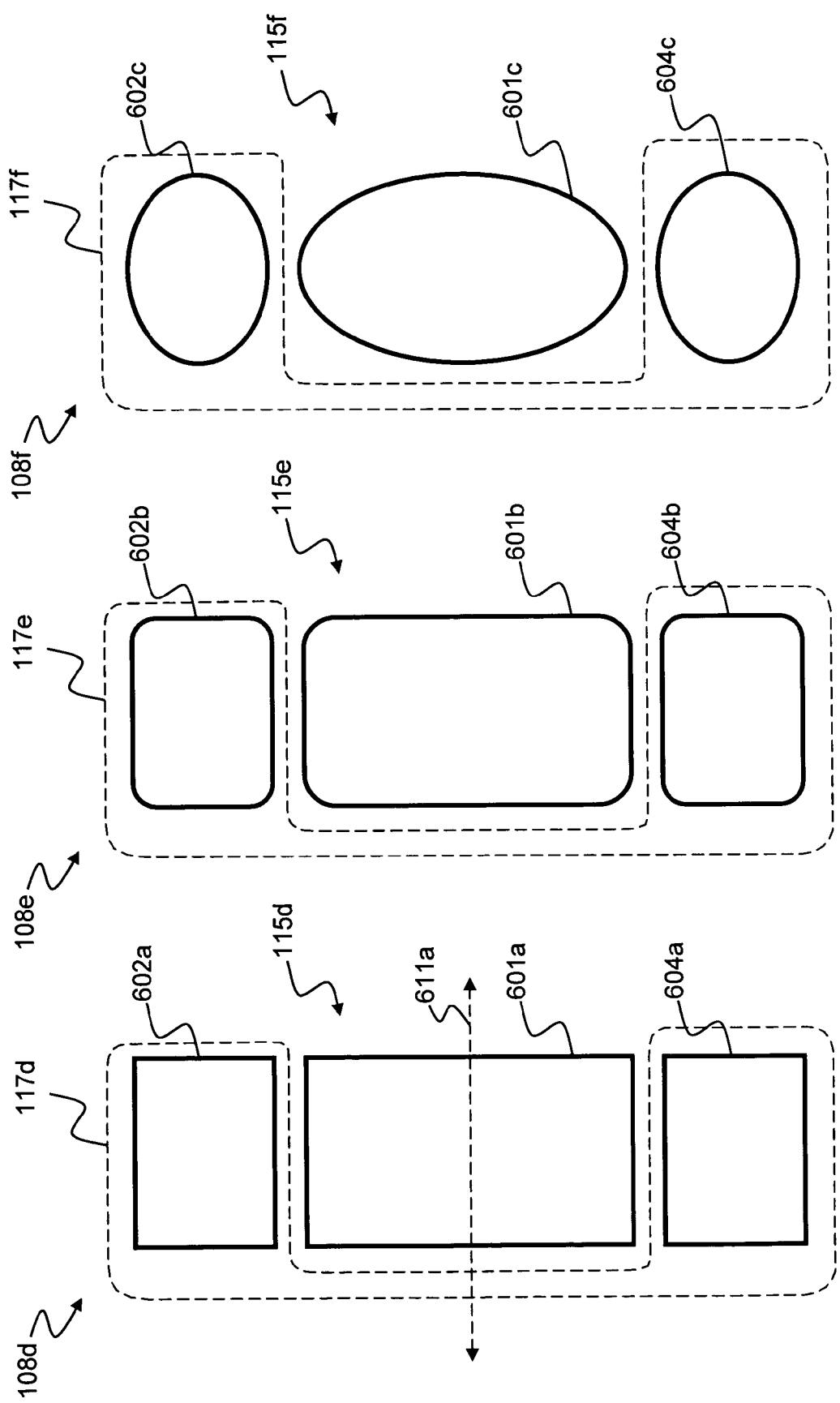

ANTENNA SYSTEM INCLUDING SIMULTANEOUS PHASE AIDING AND PHASE CANCELING ELEMENTS

CROSS-REFERENCE TO RELATED APPLICATIONS

This application claims the benefit of U.S. Provisional Application Ser. No. 60/478,942, filed Jun. 16, 2003, the teachings of which are incorporated herein by reference.

TECHNICAL FIELD

The present invention relates to marker detection systems such as electronic article surveillance (EAS) and radio frequency identification (RFID) systems, and, in particular, to an antenna system including simultaneous phase aiding and phase canceling elements for minimizing null zones in an interrogation zone of such systems.

BACKGROUND

A variety of marker detection systems such as EAS and RFID systems are available to protect and track assets. In an EAS system, an interrogation zone may be established at the perimeter, e.g. at an exit area, of a protected area such as a retail store. The interrogation zone is established by an antenna system positioned adjacent to the interrogation zone. The antenna system may include one or more antennas to establish an electromagnetic field within the interrogation zone.

An EAS marker is attached to each asset to be protected. When an article is properly purchased or otherwise authorized for removal from the protected area, the EAS marker is either removed or deactivated. If the marker is not removed or deactivated, the field causes a response from the EAS marker in the interrogation zone. An antenna acting as a receiver detects the EAS marker's response indicating an active marker is in the interrogation zone. An associated controller provides an indication of this condition, e.g., an audio alarm, such that appropriate action can be taken to prevent unauthorized removal of the item.

An RFID system utilizes an RFID marker to track articles for various purposes such as inventory. The RFID marker stores data associated with the article. An RFID reader may scan for RFID markers by transmitting an interrogation signal at a known frequency. RFID markers may respond to the interrogation signal with a response signal containing, for example, data associated with the article or an RFID marker ID. The RFID reader detects the response signal and decodes the data or the RFID marker ID. The RFID reader may be a handheld reader, or a fixed reader by which items carrying an RFID marker pass. A fixed reader may be configured as an antenna located in a pedestal similar to an EAS system.

Many markers for use in such marker detection systems have a single favored orientation with respect to the stimulating field where they exhibit a maximum response, i.e., they are directional. Most markers are somewhat rectangular in shape with a high length-to-width ratio. These markers give a maximum response when oriented within a field such that the field flux coincides with the long axis of the marker. These markers tend to have little or no response when the field flux lines are substantially orthogonal to the long axis of the marker. In this instance, a vector component of the electromagnetic field in the interrogation zone in the same direction of the long axis of the marker is not sufficiently strong to provide for reliable marker detection.

Such areas of a weak electromagnetic field component in one direction within certain regions of the interrogation zone are referred to herein as "null zones." Such null zones degrade the performance of the marker detection system as a marker passing through a null zone in a certain orientation may not be properly detected. Therefore, it is desirable for marker detection systems to have a sufficiently strong and uniform electromagnetic field in many orientations across the plane of the interrogation zone in order to provide for reliable marker detection.

Various antennas, including loop and magnetic core antennas, have a drawback in that they exhibit at least one significant null zone (whether used for transmitting or receiving) for some particular orientation of the marker. For example, with loop antennas these null zones are related to the loops' axes of symmetry.

Because of this tendency to form null zones, recent marker detection antenna systems typically contain a plurality of antenna elements to allow operation either out-of-phase (field canceling) or in-phase (field aiding). However, such field canceling and field aiding elements are not simultaneously driven. Field canceling arrangements are designed to establish a strong field in the interrogation zone and a diminished field far away from the antenna to comply with regulatory requirements. Such regulatory limits specify maximum field readings at proscribed distances from the antenna system beyond the interrogation zone.

Such a field canceling arrangement for a loop antenna may include a nested loop configuration where an inner loop antenna is nested within an outer loop antenna in a common plane. The outer loop antenna and inner loop antenna are designed so that at least a portion of the electromagnetic fields from each of the loops are equal and opposite at a distance far away from the antenna causing such fields to cancel. Field aiding arrangements are designed so that two or more smaller antennas may produce fields in similar directions so that at least a portion of the electromagnetic fields add together.

However, even in such systems utilizing multiple antennas, there may be certain regions where the electromagnetic field vectors from adjacent antennas cancel one another to contribute to the formation of null zones. In addition, for wire loop antennas the wire loop behaves like an inductor that may be resonated or tuned by selecting an appropriate value of a resonating capacitor. Operating these multiple elements both in phase and out-of-phase usually requires different tuning adjustments when the mutual inductance between the multiple coils changes.

Accordingly, there is a need for an antenna system that establishes a marker interrogation field with minimal null zones in a facile and efficient manner.

BRIEF DESCRIPTION OF THE DRAWINGS

For a better understanding of the present invention, together with other objects, features and advantages, reference should be made to the following detailed description which should be read in conjunction with the following figures wherein like numerals represent like parts:

FIGS. 3A to 3C are plots of the resultant horizontal electromagnetic field produced by an exemplary antenna system consistent with FIG. 2A during a first phase orientation (FIG. 3A), a second phase orientation (FIG. 3B), and during a composite of both phase orientations (FIG. 3C);

FIG. 6A is a schematic illustration of another exemplary embodiment of an antenna system consistent with the invention having stacked rectangular shaped coils;

FIG. 6B is a schematic illustration of another exemplary embodiment of an antenna system consistent with the invention having stacked rectangular shaped coils with rounded corners;

FIG. 6C is a schematic illustration of another exemplary embodiment of an antenna system consistent with the invention having stacked elliptical shaped coils;

DETAILED DESCRIPTION

For simplicity and ease of explanation, the present invention will be described herein in connection with various exemplary embodiments thereof associated with EAS systems. An antenna system consistent with the present invention may, however, be used in connection with various marker detection systems such as an RFID or other system. It is to be understood, therefore, that the embodiments described herein are presented by way of illustration, not of limitation.

Figure 1:
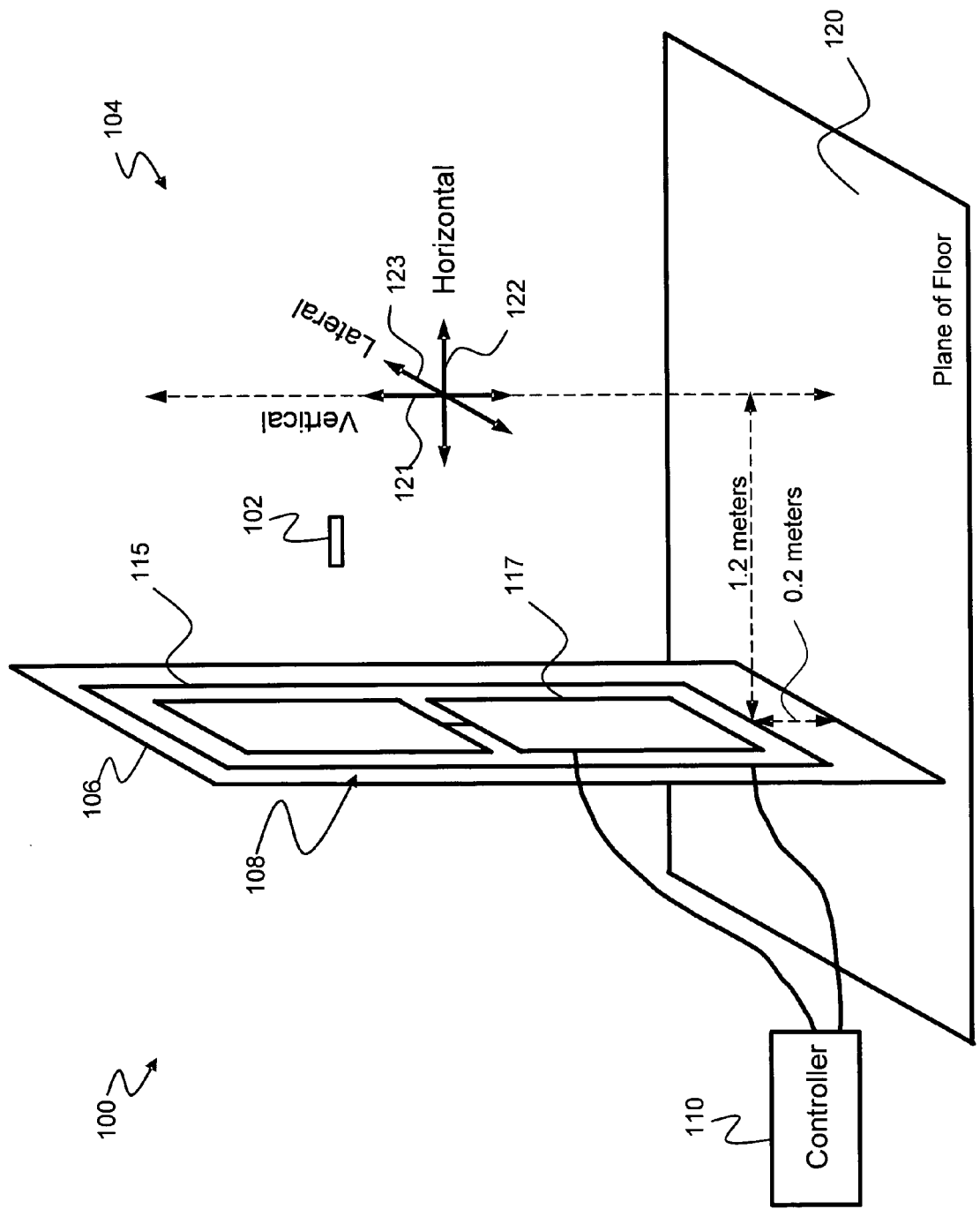
FIG. 1 is a schematic illustration of an exemplary EAS system including an antenna system consistent with the invention for detection of EAS markers in an associated interrogation zone.

FIG. 1 illustrates an exemplary EAS system 100 including an antenna system 108 consistent with the invention. The EAS system 100 generally includes a controller 110 and the antenna system 108. The antenna system 108 may be housed in a pedestal 106. The controller 110 is shown separate from the pedestal 106 for clarity but may be included in the pedestal housing. In transmitting mode, the controller 110 provides one or more excitation signals to the antenna system 108 so that the antenna system produces an appropriate electromagnetic field in the interrogation zone 104 as further detailed herein.

In the exemplary embodiment of FIG. 1, the system 100 is configured as a transceiver and the associated controller 110 includes proper control and switching to switch from transmitting to receiving functions at predetermined time periods. Those skilled in the art will recognize that the system may be configured with separate transmitting and receiving antennas located on the same side or on separate sides of the interrogation zone 104. In addition, there may be one or more controllers 110 in the system 100 for providing various excitation signals.

An EAS marker 102 may be placed, e.g. by a manufacturer or retailer, on each item or asset to be protected. If the marker is not removed or deactivated prior to entering an interrogation zone 104, the field established by the antenna system 108 will cause a response from the EAS marker 102. The antenna system 108 acting as a receiver will receive this response, and the controller 110 will provide an output indicating that the marker 102 is in the interrogation zone 104.

The antenna system 108 consistent with the invention may include a reference antenna system 115 and a phase canceling antenna system 117 simultaneously driven as further detailed herein to produce a resultant field in the interrogation zone 104 with minimized null zones for improved marker detection. The reference antenna system 115 and the phase canceling system 117 may include various types of antennas including loop antennas, magnetic core antennas, RF antennas, etc. The reference antenna system 115 and phase canceling system 117 may be located in the pedestal 106 as illustrated in FIG. 1 or may be located in various enclosures and positions about the interrogation zone.

When referring to various field and marker orientations herein, the terms "vertical," "horizontal," and "lateral" are used. As illustrated in FIG. 1, "vertical" refers to an orientation perpendicular to the plane of the floor 120 as indicated by arrow 121. "Horizontal" refers to an orientation parallel to the plane of the floor 120 and perpendicular to the plane of the pedestal 106 as indicated by arrow 122. Finally, "lateral" refers to an orientation parallel to the plane of the floor 120 and parallel to the plane of the pedestal 106 as indicated by arrow 123, e.g., in the general direction of travel of a person through the interrogation zone 104.

Figure 2A:
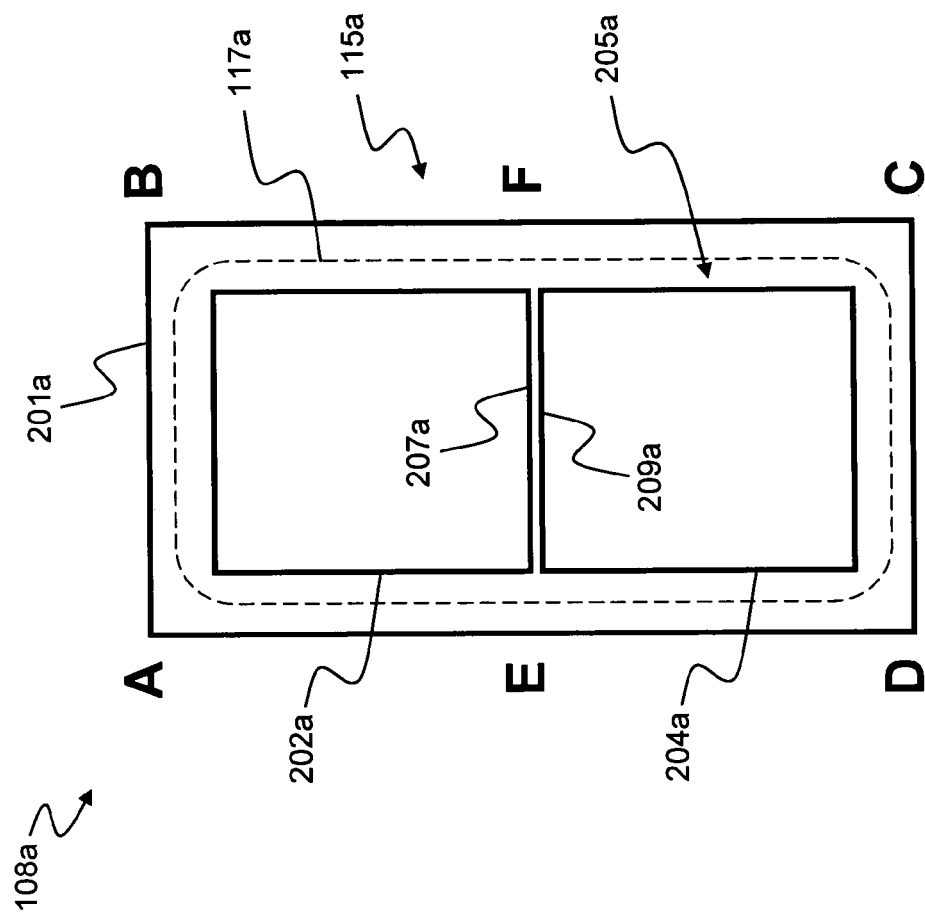
FIG. 2A is a schematic illustration of an exemplary embodiment of a nested coil antenna system consistent with the invention having rectangular shaped coils.
Figure 2C:
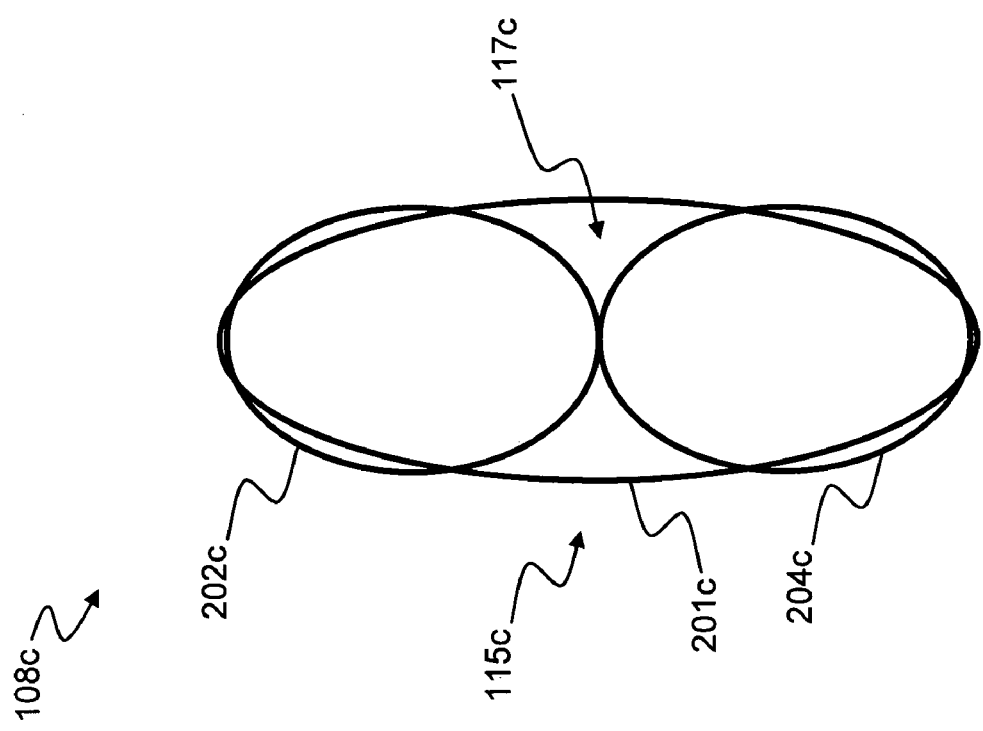
FIG. 2C is a schematic illustration of another exemplary embodiment of a nested coil antenna system consistent with the invention having elliptical shaped coils.
Figure 2B:
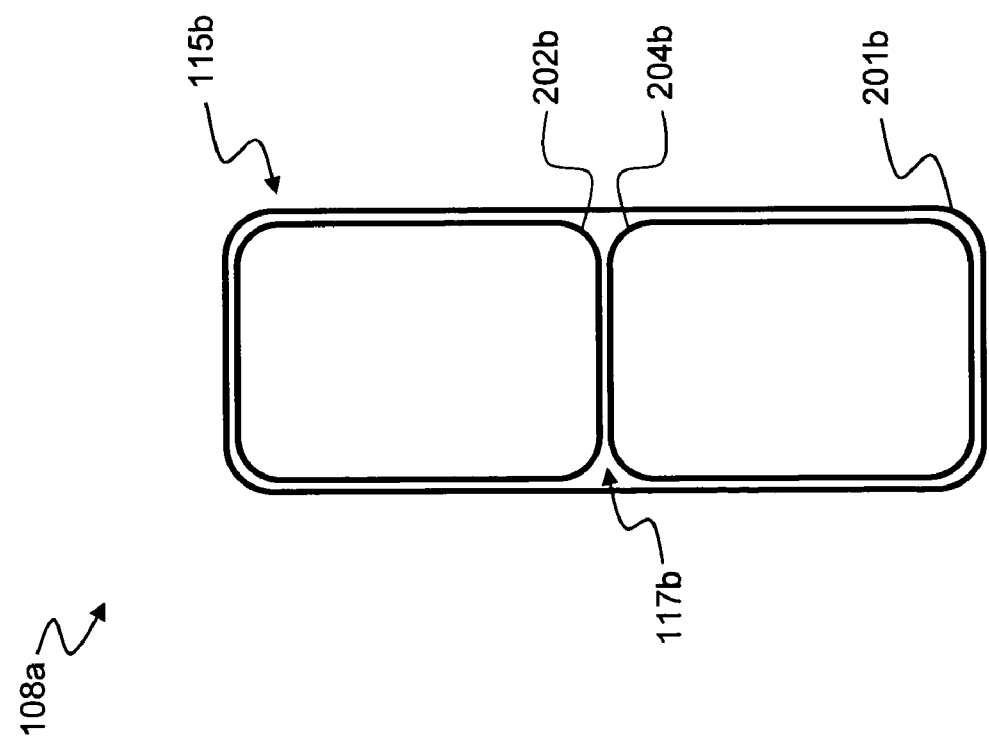
FIG. 2B is a schematic illustration of another exemplary embodiment of a nested coil antenna system consistent with the invention having rectangular shaped coils with rounded corners.

FIGS. 2A–2C illustrate exemplary embodiments 108a, 108b, and 108c of antenna systems consistent with the invention that may be utilized, for example, as the antenna system 108 of FIG. 1. For elements and systems common to the various embodiments of the invention, the numerical reference character between the embodiments is held constant. Various embodiments are distinguished by the addition of an alphanumeric character to the existing numerical reference character. For example, different embodiments of the antenna system 108 are designated 108a, 108b, etc.

FIG. 2A illustrates a nested loop antenna configuration 108a having a reference antenna system 115a and a phase canceling antenna system 117a. Combinations of location designations A through E are used to define various areas of the antenna system 108a. The reference antenna system 115a includes a reference coil 201 having a substantially rectangular geometry (ABCD). The phase canceling antenna system 117a includes a phase canceling antenna 205a having a first coil 202a (ABFE) and second coil 204a (EFCD). The coil structure of the phase canceling antenna 205a is commonly called a "figure-8" where the first coil 202a and second coil 204a are series-connected and current travels in opposite directions in the two coils 202a, 204a. Therefore, the electromagnetic field produced by the first coil 202a and second coil 204a are substantially out of phase with each other. For clarity of illustration, the reference coil 201a is shown separated from the first and second phase canceling coils 202a, 204a. However, those skilled in the art will recognize that in practice such coils may touch or even overlap.

The first and second phase canceling coils 202a, 204a may define an aperture approximately half that of the aperture defined by the reference coil 201a. A portion 207a of the first coil 202a may abut a portion 209a of the second coil 204a near the middle of the reference coil 201a (at location EF). This increases the aperture size of the first and second coils 202a, 204a, resulting in an increased field produced by the phase canceling antenna system 117a compared to smaller aperture sized coils driven at similar drive levels with a similar number of turns.

The nested loop antenna structure of FIG. 2A is illustrated having substantially rectangular coils 201a, 202a, 204a. Those skilled in the art will recognize that coils in such a nested loop configuration may have any of a variety of shapes. For instance, FIG. 2B illustrates rectangular shaped coils 201b, 202b, 204b with rounded corners and FIG. 2C illustrates elliptical shapes coils 201c, 202c, 204c. The separate coils in an antenna system consistent with the invention may also have different associated shapes.

In operation, the field(s) produced by one of the reference antenna system or the phase-canceling antenna system is reversed/flipped, e.g. periodically, while the other(s) are held in a constant direction. For example, in one embodiment, the electromagnetic fields produced by each coil 202a, 204a are flipped during different time periods, while the reference electromagnetic field produced by the reference coil 201a is held in a constant direction. In another embodiment, the reference electromagnetic field produced by the reference coil 201a is flipped during different time periods, while the fields produced by the coils 202a, 204a are held in a constant direction. At any time period, therefore, one phase canceling coil 202a or 204a will produce an associated electromagnetic field substantially in phase with the electromagnetic field produced by the reference coil 201 and the other phase canceling coil 202a or 204a will produce an electromagnetic field substantially out of phase with the field produced by the reference coil. As used herein, "substantially out of phase" means that the associated electromagnetic fields are generally oriented in opposite directions so that at least a portion of the associated electromagnetic fields in a respective orientation offset each other at a distance from the antenna. Also as used herein, "substantially in phase" means that the associated electromagnetic fields are generally oriented in similar directions so that at least a portion of the associated electromagnetic fields in a respective orientation add with each other at a distance from the antenna.

For ease of explanation, systems consistent with the invention may be described herein in connection with a configuration wherein the reference field produced by the reference coil is held in a constant direction, while the fields produced by the phase-canceling coils are reversed/flipped. It is to be understood, however, that a system consistent with the invention may be configured to operate with fields produced by the phase-canceling coils held in a constant direction while the reference field produced by the reference coil is flipped.

FIGS. 3 to 5 include plots of calculated electromagnetic field strength in amperes per meter (A/m) in various orientations versus height above the floor in meters for an exemplary antenna system 108a as shown in FIG. 2A. The field strength levels depicted in FIGS. 3–5 were taken from the plane of the floor (0 meters on the y axis) at a distance of 1.2 meters from the antenna system 108a along a vertical center line of the antenna system 108a as illustrated by arrow 121 in FIG. 1. The circles 307, 309, and 311 on the y-axis represent the location of a corresponding horizontal member of the antenna coils and their height above the plane of the floor. For instance, the lower horizontal portion (D to C) is 0.2 meters above the floor as represented by circle 307, the center horizontal portion (E to F) is 0.8 meters above the floor as represented by circle 309, and the top horizontal portion (A to B) is 1.4 meters above the floor as represented by circle 311.

The calculated field strengths are for that portion of the resultant electromagnetic field from the antenna system 108a in the specified horizontal (FIGS. 3A–3C), lateral (FIGS. 4A–4C), and vertical (FIGS. 5A–5C) orientations. For purposes of electromagnetic field calculations, all coils 201a, 202a, 204a were driven at 90 amp-turns. The geometry of the reference coil 201a was approximately 1.2 meters high (distance from A to D) by approximately 0.435 meters wide (distance from A to B). The geometry of the phase canceling coils 202a, 204a was approximately 0.6 meters high (distance from A to E and E to D) by approximately 0.435 meters wide. In addition, the lower portion of the antenna system 108a (D to C) was assumed to be mounted 0.2 meters above the plane of the floor.

FIG. 3A includes a plot 302 of the electromagnetic field strength versus height above the floor for the horizontal component of the resultant electromagnetic field when drive current in the first phase canceling coil 202a and the reference coil 201a are in phase during a first time period. Since the phase canceling coils 202a and 204a are driven out of phase with respect to each other, coil 204a is also driven out-of-phase with the reference coil 201a. In other words, the drive currents for coils 202a and 201a are essentially in the same direction, while the drive currents for coils 204a and 201a are essentially in the opposite direction.

As shown, plot 302 has a first portion 304 that "bulges" out at about 1.1 meters above the floor due to the additive effects of the horizontal electromagnetic field components produced by each coil 202a and 201a. At the same time, the plot has a second portion 306 where at least a portion of the horizontal fields produced by coils 204a and 201a offset, resulting in reduced horizontal field intensity compared to the additive portion 304. A null zone will occur at area 308 near the floor.

The null zone that would otherwise occur with the phase canceling antenna system 117a acting alone (i.e., without a reference antenna system 115a) has thus been spatially shifted to a more advantageous position given the cooperation of the field concurrently generated from the reference antenna system 115a. For example, a phase canceling antenna system 117a acting independently would typically produce a null zone in the horizontal orientation at about 0.8 meters (the height of area E to F above the floor) which is a more likely place for markers to pass through the interrogation zone than the null zone shown in area 308.

Turning to FIG. 3B, a plot 320 of the electromagnetic field strength of the horizontal component of the resultant electromagnetic field during a second time period when the second phase canceling coil 204a and the reference coil 201a are driven in phase is illustrated. Coils 202a and 201a are driven out of phase during this second time period. In contrast, to the plot 302 of FIG. 3A, the plot 320 of FIG. 3B has a portion 322 that "bulges" out at lower heights, peaking at almost 4 A/m at about 0.5 meters from the floor due to additive effects of the horizontal electromagnetic field components produced by each coil 204a and 201a. The plot 320 has another portion 324 with reduced field levels compared to portion 322 due to at least a portion of the horizontal fields produce by coils 202a and 201a offsetting each other. A null zone will occur at area 326. As with the first time period illustrated in FIG. 3A, this null zone has been spatially shifted to a more advantageous location compared to the null zone location that would otherwise occur with a phase canceling antenna system operating independently.

Figure 3C:
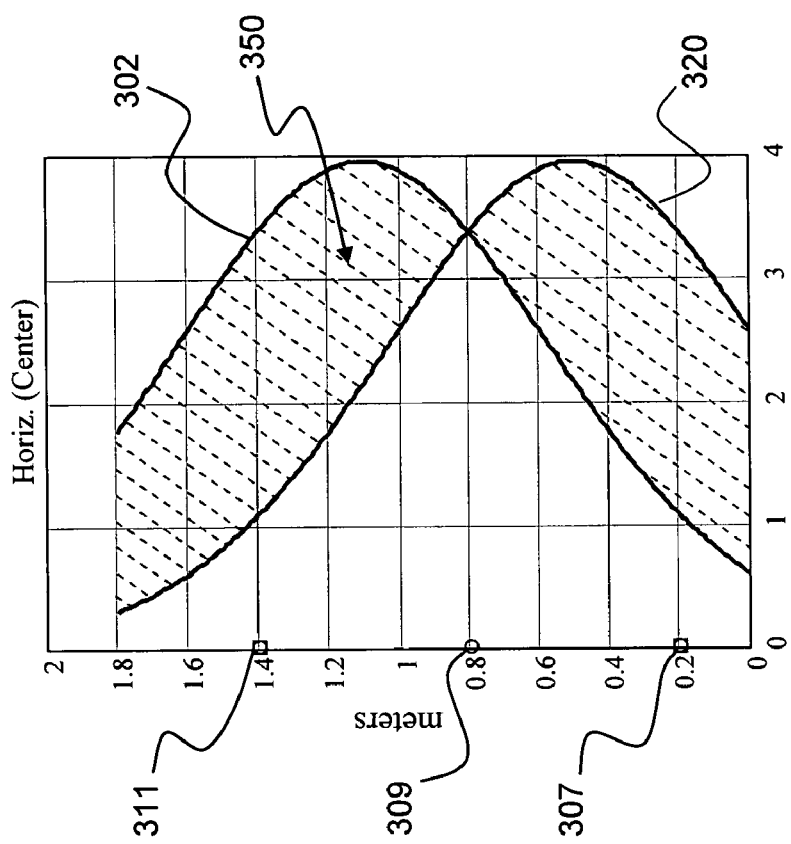

The results of a continued alternating of the phase orientations illustrated in FIGS. 3A and 3B are illustrated in FIG. 3C wherein plots 302 and 320 are superimposed. The hatched area 350 illustrates how the weaker field areas are reclaimed when both time periods of FIGS. 3A and 3B are considered. This alternating of the phase relationship or phase flipping between the reference antenna system 115a and the phase canceling antenna system 117a may or may not be stopped when a marker is first detected.

Figure 4B:
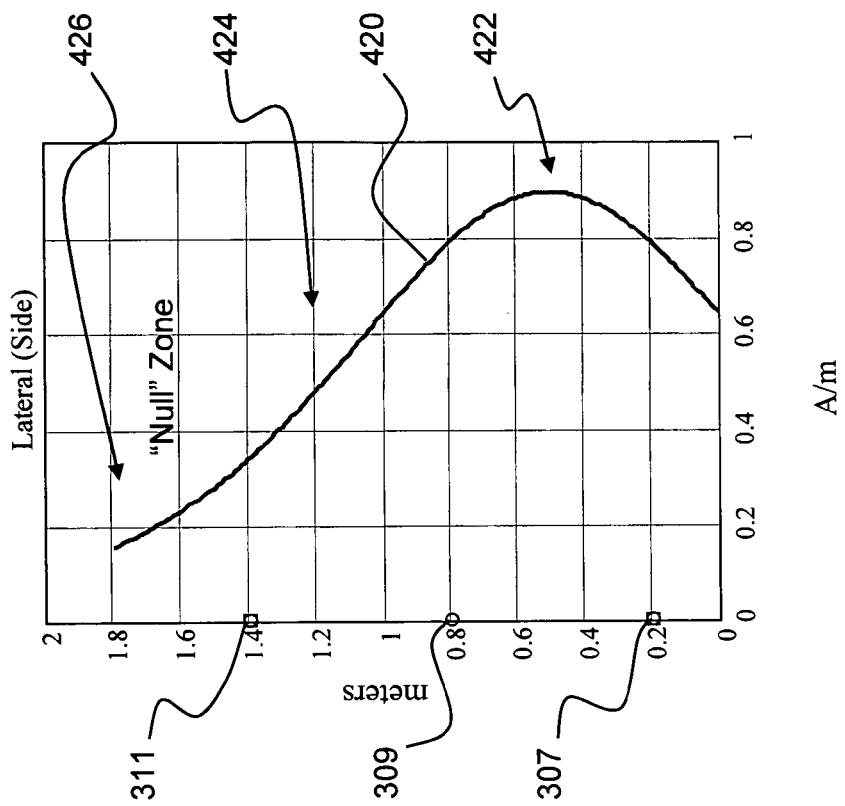
FIGS. 4A to 4C are plots of the resultant lateral electromagnetic field produced by the antenna system consistent with FIG. 2A during a first phase orientation (FIG. 4A), a second phase orientation (FIG. 4B), and during a composite of both phase orientations (FIG. 4C)
Figure 4A:
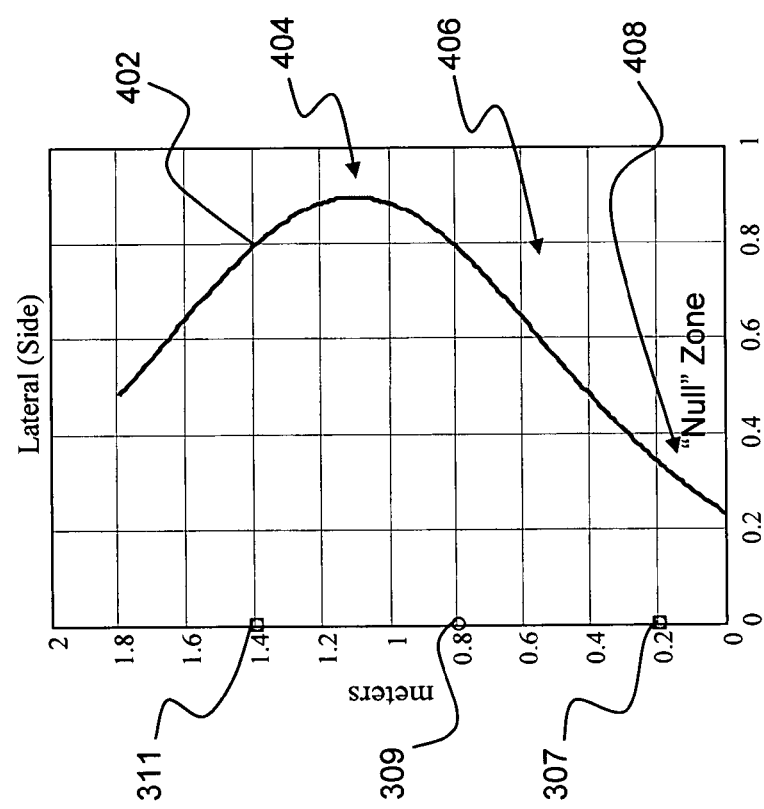

FIG. 4A includes a plot 402 of a component of the resultant electromagnetic field strength in a lateral orientation when the first phase canceling coil 202a and the reference coil 201a are driven in phase during a first time period. The plot 402 has a portion 404 that "bulges" out at about 1.1 meters above the floor due to the additive effects of the lateral field components of the fields produced by the first phase canceling coil 202a and the reference coil 201a. FIG. 4B illustrates a plot 420 of the resultant electromagnetic field strength in the lateral orientation when the second phase canceling coil 204a and the reference coil 201a are driven in phase during a second time period. The plot 420 also has a portion 422 that "bulges" out at about 0.5 meters above the floor due to the additive effects of the lateral field components of the fields produced by the second phase canceling coil 204a and the reference coil 201a.

Figure 4C:
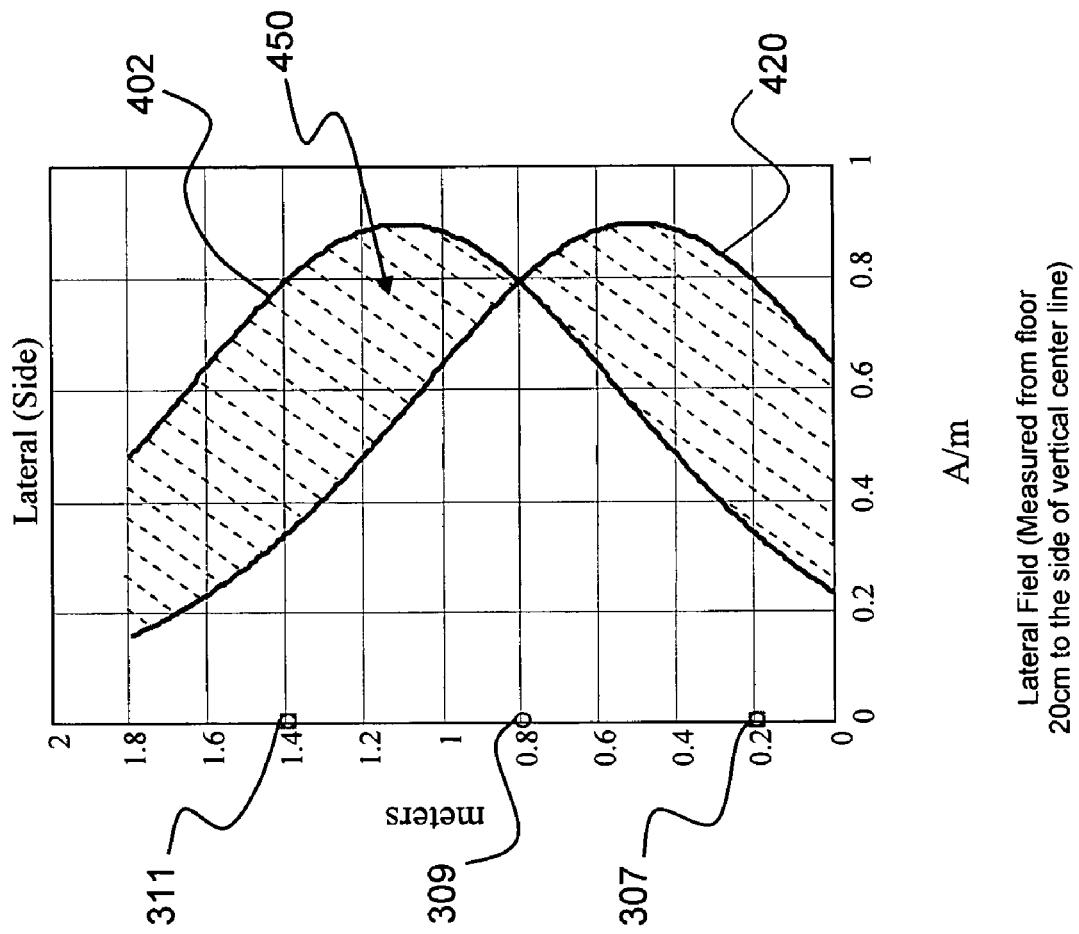

FIG. 4C superimposes plots 402 and 420, illustrating the resultant field when the phase orientations illustrated in FIGS. 4A and 4B are continuously alternated. The hatched area 450 illustrates how the weaker field areas are reclaimed when both time periods of FIGS. 4A and 4B are considered. The lateral component of the resultant electromagnetic field was calculated at a distance of 1.2 meters from the plane of the antenna system 108a and 20 centimeters to the side of the vertical center line, indicated by arrow 121 of FIG. 1.

Figure 5B:
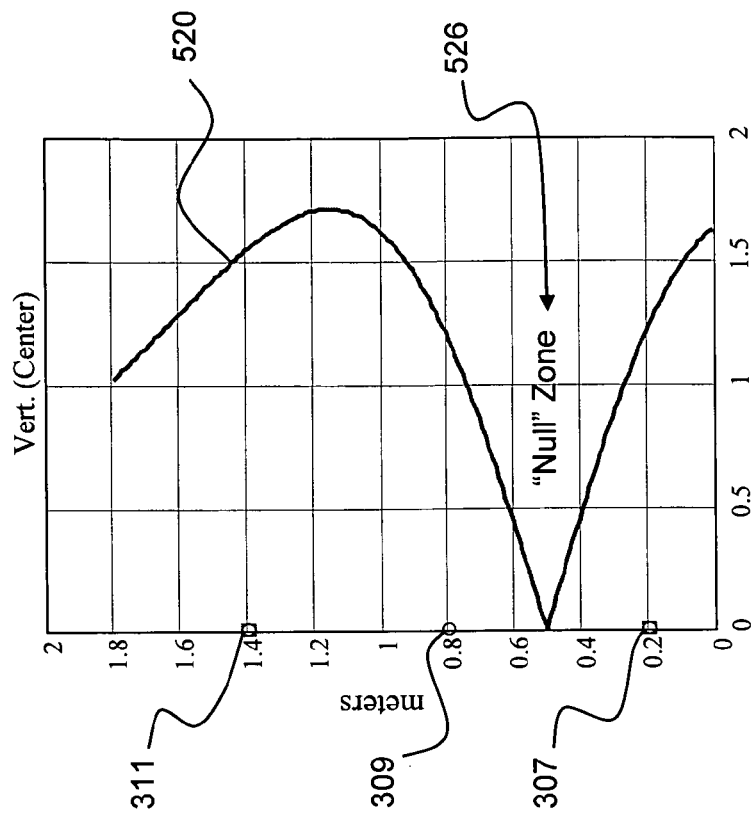
FIGS. 5A to 5C are plots of the vertical electromagnetic field produced by the antenna system consistent with FIG. 2A during a first phase orientation (FIG. 5A), a second phase orientation (FIG. 5B), and during a composite of both phase orientations (FIG. 5C)
Figure 5A:
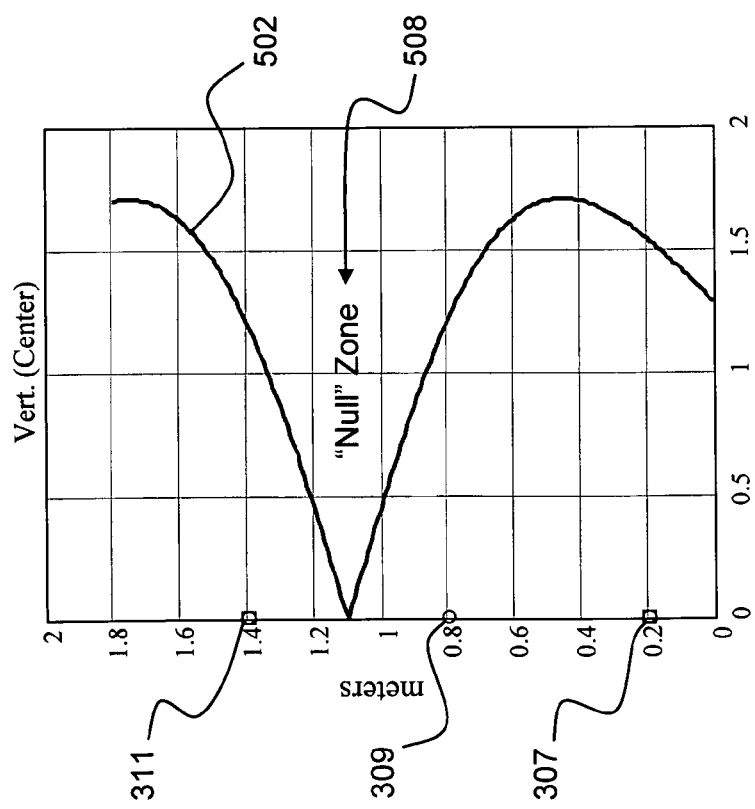
Figure 5C:
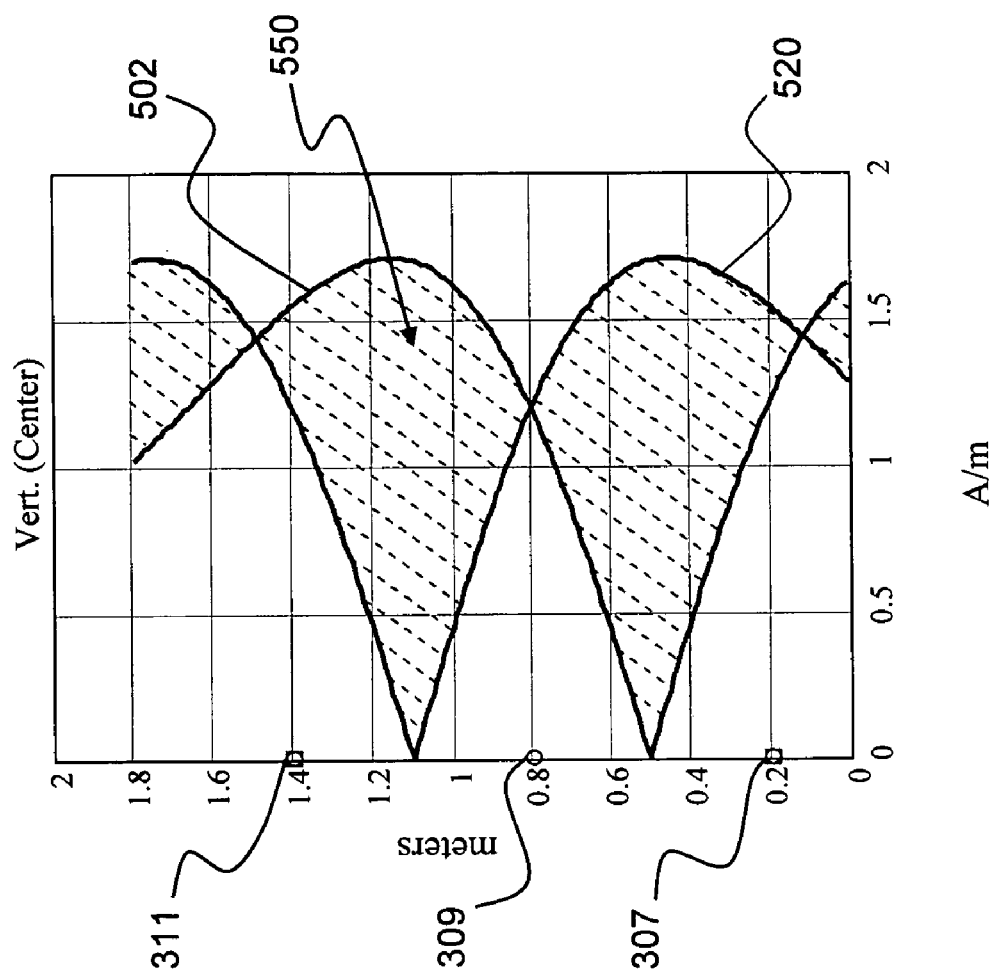

FIGS. 5A to 5C include plots for the vertical portion of the resultant electromagnetic field strength in A/m versus height in meters above the floor. FIG. 5A illustrates a plot 502 of the vertical component of the resultant electromagnetic field strength when the first phase canceling coil 202a and the reference coil 201a are driven in phase during a first time period. Plot 502 shows a null zone portion 508 at about 1.1 meters above the floor. FIG. 5B is a plot 520 of the vertical component of the electromagnetic field strength when the second phase canceling coil 204a and the reference coil 201a are driven in phase during a second time period. Plot 520 shows a null zone portion 526 at about 0.5 meters above the floor.

FIG. 5C superimposes the plots 502 and 520. The hatched area 550 illustrates how the weaker field areas are reclaimed when both time periods of FIGS. 5A and 5B are considered. The electromagnetic field portion in the vertical orientation was calculated at a distance of 1.2 meters from the plane of the antenna system 108a along the vertical center line, indicated by arrow 121 of FIG. 1.

In operation, the phase canceling coils 202a, 204a may be driven as hard as possible, e.g., with a relatively high drive current. The drive current for the reference coil 201a may then be adjusted such that the resultant electromagnetic field falls just below the regulatory limit at a predetermined distance far away from the antenna system 108a. This will provide the maximum field level in the interrogation zone while still complying with regulatory limits. This could, however, lead to a large difference in transmitter load for the two channels. Once the dimensions for the phase canceling coils 202a, 204a and for the reference coil 201a have been selected, their respective areas are constant. Field strength then depends on ampere-turns. Designs are typically a compromise of practical limits on amperes from the transmitter and impedance and Q of the load, which is controlled by the area and number of turns.

Symmetrical arrangement of coils 201a, 202a about a centerline of the reference coil 201a provides equal coupling between fields produced by the phase canceling coils 202a, 204a and the reference coil 201a when the first phase canceling coil 202a and the reference coil 201a are in phase and when the second phase canceling coils 204a and the reference coil 201a are in phase. In such a configuration, the antennas only have to be resonated once. Other symmetrical arrangements than those illustrated in FIGS. 2A to 2C may also be realized. For instance, the reference loop antenna may have a length greater than a width and have an imaginary centerline bisecting the length of the reference antenna into two equal portions. Symmetrically positioning the first and second phase canceling antennas about this centerline in any variety of fashions will also provide a configuration wherein the antennas only have to be resonated once.

Turning to FIGS. 6A to 6C, additional embodiments of an antenna system consistent with the invention are illustrated. FIG. 6A illustrates a stacked antenna system 108d consistent with the invention where the reference antenna system 115d has a reference coil 601a disposed between phase canceling coils 602a, 604a of the phase canceling antenna system 117d. The geometry of FIG. 6A is somewhat similar to the earlier described embodiment of FIG. 2A. However, the reference coil 601a area has been reduced compared to reference coil 201a such that the reference coil 601a may be disposed between the first phase canceling coil 602a and the second phase canceling coil 604a. In addition, the first phase canceling coil 602a area has been reduced compared to coil 202a and the second phase canceling coil 604a area has also been reduced compared to coil 204a. The first phase canceling coil 602a and the second phase canceling coil 604a may be symmetrically disposed about a centerline 611a of the reference antenna 601a, bisecting the length of the reference antenna into two equal portions.

Operation of the antenna system 108d is similar to that earlier described with reference to the antenna system 108a of FIG. 2A. Those skilled in the art will recognize that coils in such a stacked loop configuration of FIG. 6A may have any of a variety of shapes. For instance, FIG. 6B illustrates rectangular shaped coils 601b, 602b, 604b with rounded corners and FIG. 6C illustrates elliptical shapes coils 601c, 602c, 604c. In addition, the coils in FIGS. 6A to 6C are shown separated from the each other for clarity of illustration. However, those skilled in the art will recognize that in practice such coils may touch or even overlap., The phase canceling coils in the various embodiments of the antenna systems 108d, 108e, 108f may be figure-8 arrangements where the first coil and second coil are series-connected and current travels in opposite directions in the two coils.

Figure 7:
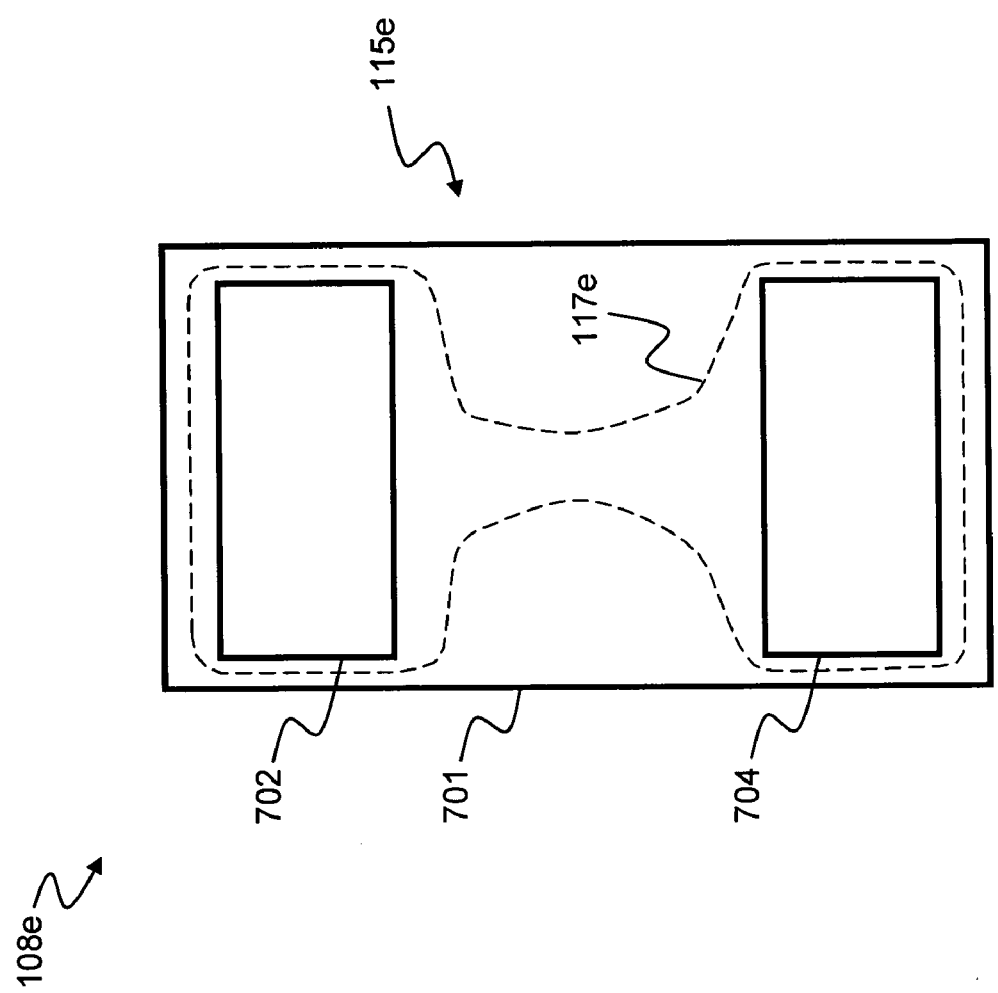
FIG. 7 is a schematic illustration of another exemplary embodiment of an antenna system consistent with the invention is a nested configuration.

FIG. 7 shows yet another embodiment 108e of an antenna system consistent with the invention. In this embodiment, the antenna system 108e includes a reference antenna system 115e including coil 701, and a phase canceling antenna system 117e including phase canceling coils 702, 704. Compared to the embodiment of FIG. 6A, the coil 701 area has been expanded to surround both phase canceling coils 702, 704 leading to a nested structure. Those skilled in the art will recognize that coils in such a configuration of FIG. 7 may have any of a variety of shapes such as rectangular shaped coils with rounded corners, elliptical shaped coils, etc. In addition, the coils 701, 702, 704 in FIG. 7 are shown separated from each other for clarity of illustration. However, those skilled in the art will recognize that in practice such coils may touch or even overlap.

Figure 8A:
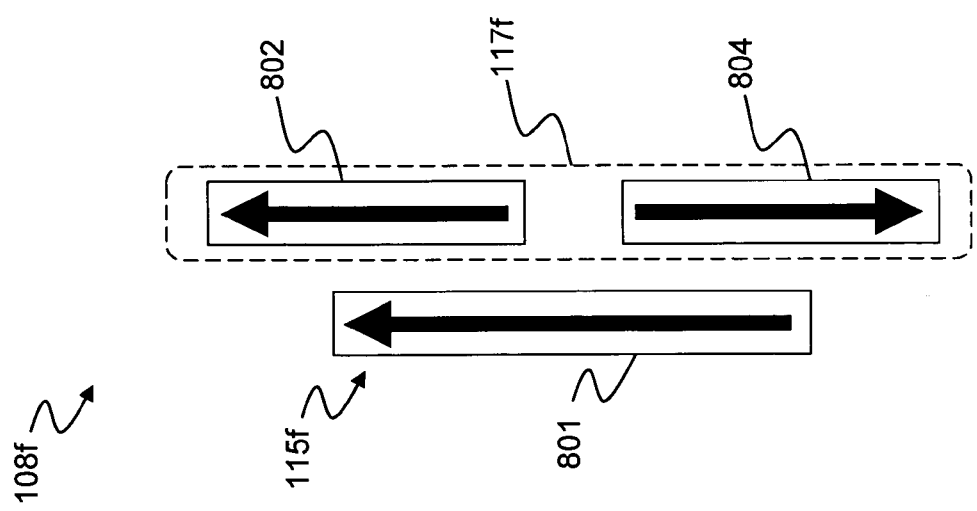
FIGS. 8A and 8B are a schematic illustration of another exemplary embodiment of an antenna system consistent with the invention having magnetic core antennas.
Figure 8B:
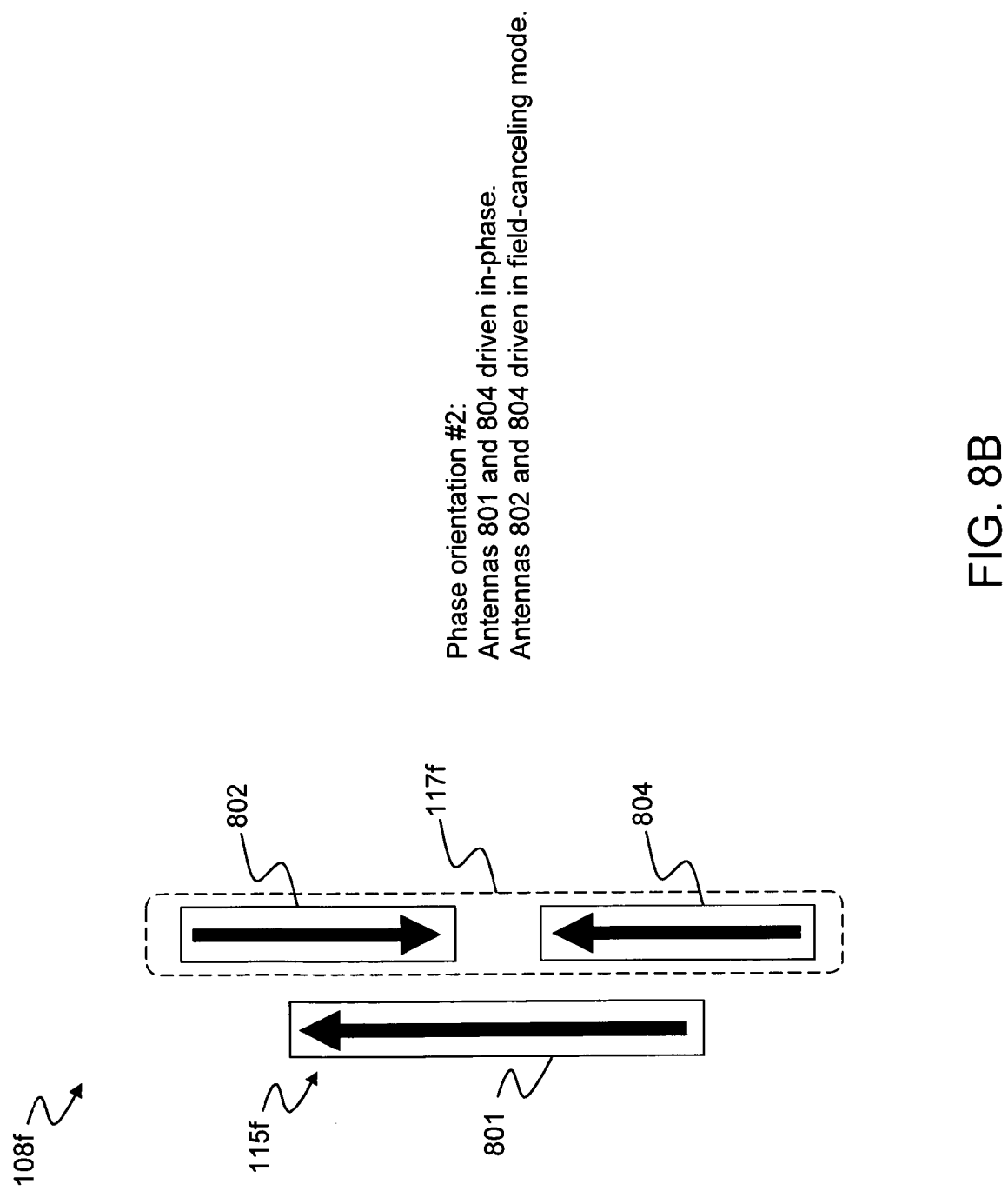

Turning to FIGS. 8A and 8B, another exemplary embodiment of an antenna system 108f including magnetic core antennas is illustrated. Those skilled in the art will recognize that a magnetic core antenna generally includes a core with a wire coil winding thereon which may be further coupled to a controller of the marker detection system. The core may be any of a variety of shapes such as rectangular, cylindrical, spherical, etc. The core may be formed of a powdered iron or any other suitable material known in the art.

The reference antenna system 115f includes a reference magnetic core antenna 801. The phase canceling antenna system 117f includes a first phase canceling magnetic core antenna 802 and a second phase canceling magnetic core antenna 804. The reference antenna system 115f and the phase canceling antenna system 117f are illustrated using associated arrows. The illustrated arrows indicate the phasing of the fields associated with the systems 115f and 117f in one exemplary embodiment. In particular, during a first time period as illustrated in FIG. 8A, the reference magnetic core antenna 801 and the first phase cancelling magnetic core antenna 802 are driven in phase. During a second time period as illustrated in FIG. 8B, the reference magnetic core antenna 801 and the second phase canceling magnetic core antenna 804 are driven in phase. During both time periods, the first and second phase canceling antennas 802, 804 remain driven in a phase canceling mode with respect to each other despite phase flipping of each. Again, although in the illustrated exemplary embodiment the phase of the fields generated by the first and second phase canceling antennas 802,804 are flipped while the phase of the field generated by the reference antenna 801 is held constant, a system 108f consistent with the invention may be configured so that the phase of the field generated by the reference antenna 801 is flipped, while the phase of the fields from antennas 802,804 are held constant.

Figure 9:
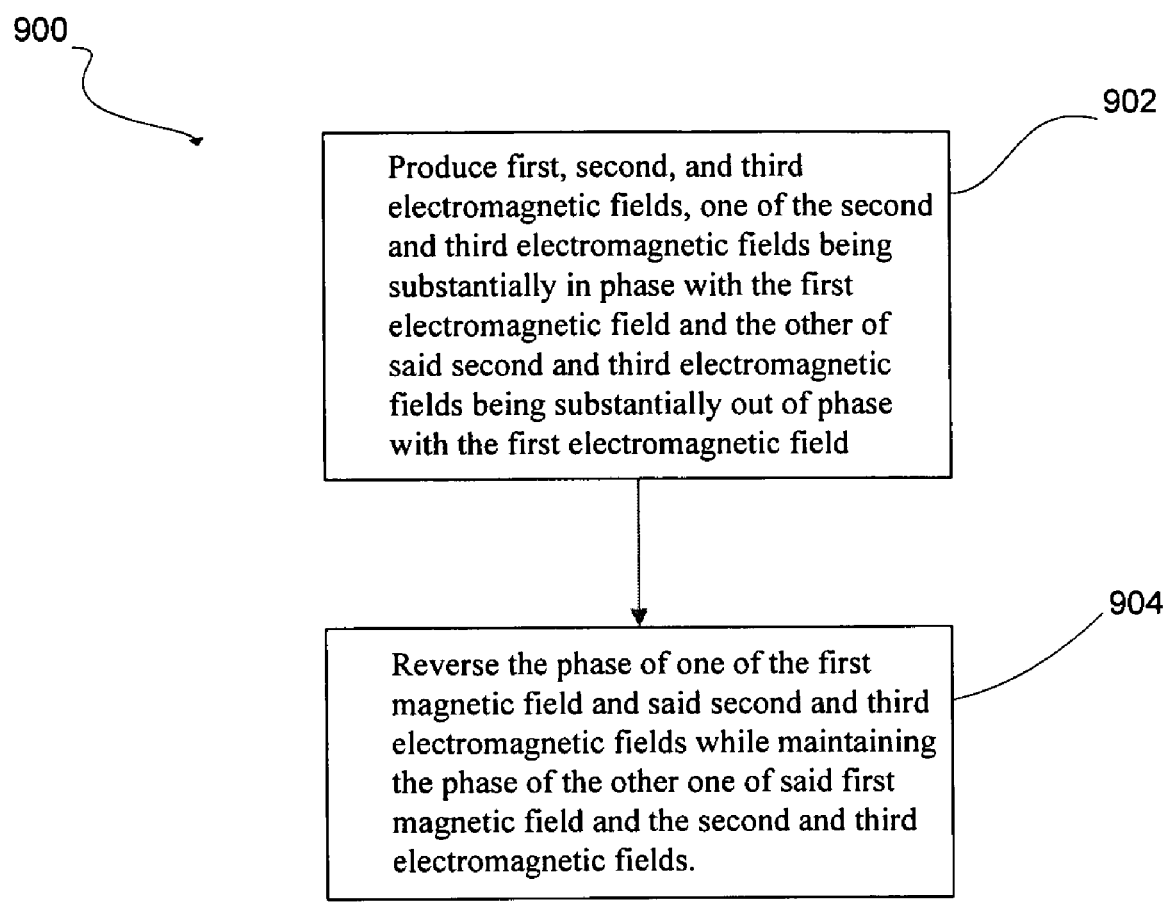
FIG. 9 is a block flow diagram of an exemplary method consistent with the invention.
Figure 10:
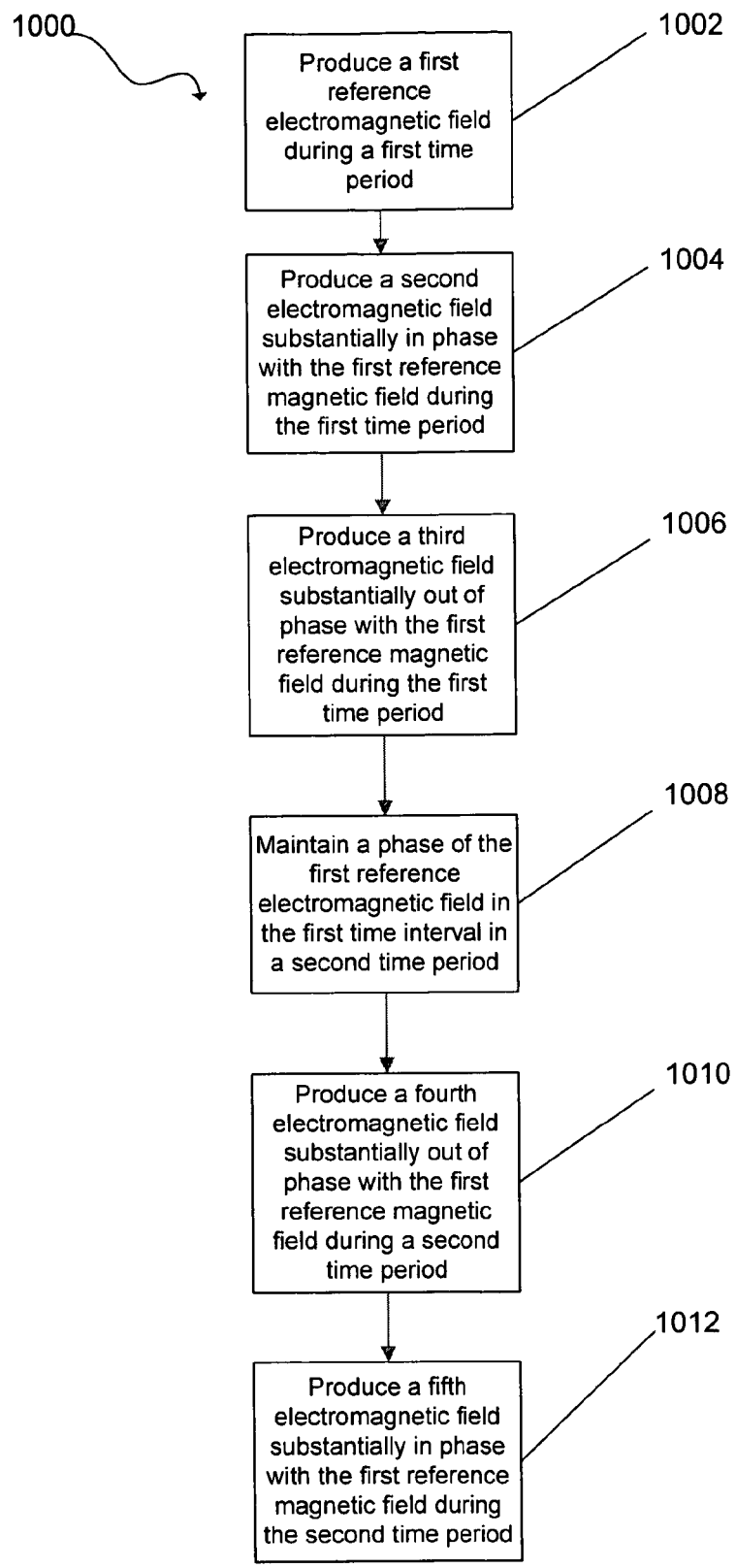
FIG. 10 is a block flow diagram of another exemplary method consistent with the invention.

Exemplary methods of operation of an antenna system consistent with the invention are shown in block flow diagram form in FIGS. 9 and 10. The block flow diagrams referenced herein include particular sequences of steps. It can be appreciated, however, that the sequence of steps merely provides an example of how the general functionality described herein can be implemented. Further, each sequence of steps does not have to be executed in the order presented unless otherwise indicated.

With reference to FIG. 9, in one method of operation consistent with the present invention first, second, and third electromagnetic fields may be produced 902 whereby one of the second and third electromagnetic fields is substantially in phase with the first electromagnetic field and the other of the second and third electromagnetic fields is substantially out of phase with the first electromagnetic field. The phase of one of the first magnetic field and said second and third electromagnetic fields may be reversed 904 while maintaining the phase of the other one of the first magnetic field and the second and third electromagnetic fields. Reversing or flipping of the phase, may be performed periodically. A reference antenna system may produce the first field and a phase canceling antenna system may produce the second and third fields. Again, either the fields produced by the phase canceling antenna system or the field produced by the reference antenna system may be periodically reversed/ flipped.

FIG. 10 illustrates an exemplary embodiment 1000 of a method consistent with the present invention wherein the a first magnetic field, e.g. produced by a reference antenna, is maintained at a constant phase while the phase of second and third electromagnetic fields are reversed in first and second time periods. In the illustrated embodiment, a first electromagnetic field is produced 1002 during a first time period. A second electromagnetic field substantially in phase with the first electromagnetic field is produced 1004 during the first time period, and a third electromagnetic field substantially out of phase with the first electromagnetic field is produced 1006 during the first time period. The phase orientation of the first electromagnetic field is maintained 1008, i.e. unchanged, from a first time period through a second time period. A fourth electromagnetic field is produced 1010 substantially out of phase with the first reference electromagnetic field during the second time period, and a fifth electromagnetic field is produced 1012 substantially in phase with the first reference electromagnetic field during the second time period. Steps 1004–1012 may be repeated continuously to minimize null zones in the interrogation zone. Once a marker is detected, switching of phase orientations between the second and third fields may continue or may be halted.

There is thus provided an antenna system for minimizing the effect of null zones in an interrogation zone of a marker detection system. The antenna system includes a reference antenna system configured to produce a first electromagnetic field during a first time period. The antenna system also includes a phase canceling antenna system configured to produce a second electromagnetic field substantially in phase with the first electromagnetic field during the first time period and a third electromagnetic field substantially out of phase with the first electromagnetic field during the first time period.

Driving the reference antenna system and the phase canceling antenna system simultaneously produces stronger local field in the interrogation zone since at any given time part of the resultant field in the interrogation zone is being produced by the sum of one field produced by the phase canceling antenna system and the reference antenna system. In addition, another part of the resultant field in the interrogation zone is being produced by the difference between one field produced by the phase canceling antenna system and the reference antenna system. The net effect is that the local field and the interrogation zone gets larger, while the average field at a distance far from the antenna system does not. Therefore, an increased detection distance and more reliable detection for a given antenna structure may be realized. Alternatively, similar detection performance may be obtained with a smaller and less costly antenna structure.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An antenna system comprising:
    a reference antenna system configured to produce a first reference electromagnetic field during a first time period; and
    a phase canceling antenna system configured to produce a second electromagnetic field substantially in phase with said first reference electromagnetic field during said first time period while also producing a third electromagnetic field substantially out of phase with said first reference electromagnetic field during said first time period.

2. The antenna system of claim 1, wherein said reference antenna system is configured to produce said first reference electromagnetic field during a second time period, and wherein said phase canceling antenna system is configured to produce a fourth electromagnetic field during said second time period, said fourth electromagnetic field being substantially out of phase with said first reference electromagnetic field, and wherein said phase canceling antenna is configured to produce a fifth electromagnetic field during said second time period, said fifth electromagnetic field being substantially in phase with said first reference electromagnetic field.

3. The antenna system of claim 2, wherein said phase canceling antenna system is configured to said second and third electromagnetic fields alternately with said fourth and fifth electromagnetic fields.

4. The antenna system of claim 1, wherein said phase canceling antenna system is configured to produce said second and third electromagnetic fields during a second time period, and wherein said reference antenna system is configured to produce a second reference electromagnetic field during said second time period, said second reference electromagnetic field being substantially out of phase with said second electromagnetic field and substantially in phase with said third electromagnetic field.

5. The antenna system of claim 4, wherein said reference antenna system is configured to alternately produce said first and second reference electromagnetic fields.

6. The antenna system of claim 1, wherein said reference antenna system comprises a reference loop antenna for producing said first reference electromagnetic field, and wherein said phase canceling antenna system comprises a first phase canceling loop antenna and a second phase canceling loop antenna, said first loop antenna configured to produce said second electromagnetic field and said second loop antenna configured to produce said third electromagnetic field.

7. The antenna system of claim 6, wherein said reference loop antenna and said first and second phase canceling loop antennas lie substantially in a common plane.

8. The antenna system of claim 6, wherein said reference loop antenna defines a reference aperture and wherein said first phase canceling loop antenna and said second phase canceling loop antenna are disposed at least partially in said reference aperture.

9. The antenna system of claim 6, wherein said reference loop antenna is disposed between said first phase canceling loop antenna and said second phase canceling loop antenna.

10. The antenna system of claim 6, wherein said first phase canceling loop antenna and said second phase canceling loop antenna are symmetrically disposed about a centerline axis of said reference loop antenna, said centerline axis bisecting said reference loop antenna.

11. The antenna system of claim 1, wherein said reference antenna system comprises a reference magnetic core antenna for producing said first reference electromagnetic field, and wherein said phase canceling antenna system comprises a first phase canceling magnetic core antenna for producing said second electromagnetic field and a second phase canceling magnetic core antenna for producing said third electromagnetic field.

12. The antenna system of claim 11, wherein said reference magnetic core antenna is configured to produce said first reference electromagnetic field during a second time period, and wherein said first phase canceling magnetic core antenna is configured to produce a fourth electromagnetic field during said second time period, said fourth electromagnetic field being substantially out of phase with said first reference electromagnetic field, and wherein said second phase canceling magnetic core antenna is configured to produce a fifth electromagnetic field during said second time period, said fifth electromagnetic field being substantially in phase with said first reference electromagnetic field.

13. The antenna system of claim 12, wherein said phase canceling antenna system is configured to produce said second and third electromagnetic fields alternately with said fourth and fifth electromagnetic fields.

14. The antenna system of claim 11, wherein said phase canceling antenna system is configured to produce said second and third electromagnetic fields during a second time period, and wherein said reference magnetic core antenna is configured to produce a second reference electromagnetic field during said second time period, said second reference electromagnetic field being substantially out of phase with said second electromagnetic field and substantially in phase with said third electromagnetic field.

15. The antenna system of claim 14, wherein said reference antenna system is configured to alternately produce said first and second reference electromagnetic fields.

16. The antenna system of claim 1, said system further comprising:
    at least one controller configured to provide a first excitation signal and a second excitation signal during said first time period;
    said reference antenna system being responsive to said first excitation signal to produce said first electromagnetic field; and said phase canceling antenna system being responsive to said second excitation signal to produce said second electromagnetic field and said third electromagnetic field.

17. An antenna system comprising:
    at least one controller configured to provide a first excitation signal and a second excitation signal;
    a reference antenna responsive to said first excitation signal to produce a first electromagnetic field; and
    a phase canceling antenna system responsive to said second excitation signal to produce a second electromagnetic field substantially in phase with said first reference electromagnetic field while also producing a third electromagnetic field substantially out of phase with said first reference electromagnetic field,
    said controller being configured to periodically reverse a polarity of one of said first excitation signal and said second excitation signal while maintaining a polarity of the other of said first excitation signal and said second excitation signal.

18. The antenna system of claim 17, wherein said reference antenna comprises a reference loop antenna for producing said first reference electromagnetic field, and wherein said phase canceling antenna system comprises a first phase canceling loop antenna and a second phase canceling loop antenna, said first loop antenna configured to produce said second electromagnetic field and said second loop antenna configured to produce said third electromagnetic field.

19. The antenna system of claim 18, wherein said reference loop antenna and said first and second phase canceling loop antennas lie substantially in a common plane.

20. The antenna system of claim 18, wherein said reference loop antenna defines a reference aperture and wherein said first phase canceling loop antenna and said second phase canceling loop antenna are disposed at least partially in said reference aperture.

21. The antenna system of claim 18, wherein said reference loop antenna is disposed between said first phase canceling loop antenna and said second phase canceling loop antenna.

22. The antenna system of claim 18, wherein said first phase canceling loop antenna and said second phase canceling loop antenna are symmetrically disposed about a centerline axis of said reference loop antenna, said centerline axis bisecting said reference loop antenna.

23. The antenna system of claim 17, wherein said reference antenna system comprises a reference magnetic core antenna for producing said first reference electromagnetic field, and wherein said phase canceling antenna system comprises a first phase canceling magnetic core antenna for producing said second electromagnetic field and a second phase canceling magnetic core antenna for producing said third electromagnetic field.

24. A method of spatially shifting null zones in an interrogation zone of a marker detection system, said method comprising:
producing first, second, and third electromagnetic fields, one of said second and third electromagnetic fields being substantially in phase with said first electromagnetic field and the other of said second and third electromagnetic fields being substantially out of phase with said first electromagnetic field; and
reversing the phase of one of said first magnetic field and said second and third electromagnetic fields while maintaining the phase of the other one of said first magnetic field and said second and third electromagnetic fields.

25. A method according to claim 24, wherein said reversing the phase of one of said first magnetic field and said second and third electromagnetic fields is performed periodically.

26. A method according to claim 24,
wherein said first electromagnetic field is produced by driving a reference antenna with at least one reference antenna excitation signal, and said second and third electromagnetic fields are produced by driving at least one phase canceling antenna with at least one phase canceling antenna excitation signal; and
wherein said reversing the phase of one of said first magnetic field and said second and third electromagnetic fields is performed by reversing the polarity of one of said reference antenna excitation signal and said phase canceling antenna excitations signal, respectively.

27. A method of spatially shifting null zones in an interrogation zone of a marker detection system, said method comprising:
producing a first reference electromagnetic field during a first time period;
producing a second electromagnetic field substantially in phase with said first reference electromagnetic field during said first time period; and
producing a third electromagnetic field substantially out of phase with said first reference electromagnetic field during said first time period.

28. The method of claim 27, said method further comprising:
producing said first reference electromagnetic field during a second time period;
producing a fourth electromagnetic field substantially out of phase with said first reference electromagnetic field during said second time period; and
producing a fifth electromagnetic field substantially in phase with said first reference electromagnetic field during said second time period.

29. The method of claim 27, said method further comprising:
producing said second electromagnetic field during a second time period;
producing said third electromagnetic field during a second time period; and
producing a second reference electromagnetic field during said second time period, said second reference electromagnetic field being substantially out of phase with said second electromagnetic field and substantially in phase with said third electromagnetic field during said second time period.

\* \* \* \* \*